United States Patent [19]

Yajima et al.

[11] 4,358,576

[45] Nov. 9, 1982

[54] ORGANOMETALLIC POLYMER AND PROCESS FOR PRODUCTION THEREOF

[75] Inventors: Seishi Yajima, Ibaraki; Kiyohito Okamura; Toetsu Shishido, both of Higashi; Kazushige Fukuda, Kitakyushu, all of Japan

[73] Assignees: Kurosaki Refractories, Co., Ltd., Fukuoka; Seishi Yajima, Ibaraki, both of Japan

[21] Appl. No.: 254,243

[22] Filed: Apr. 15, 1981

[30] Foreign Application Priority Data

Apr. 17, 1980 [JP] Japan ................................ 55-49581

[51] Int. Cl.³ .............................................. C08G 77/22
[52] U.S. Cl. ....................................... 528/30; 528/25; 528/26; 528/27; 528/29; 528/33; 528/35; 528/37
[58] Field of Search ...................... 528/30, 33, 35, 37, 528/25, 26, 27, 29

[56] References Cited

U.S. PATENT DOCUMENTS 4,052,430  10/1977  Yajima et al. .................... 260/448.2
4,220,600  9/1980   Yajima et al. ....................... 556/434

Primary Examiner—Melvyn I. Marquis
Attorney, Agent, or Firm—Ladas & Parry

[57] ABSTRACT

An organometallic polymer of which the main-chain skeleton consists of a Si-$CH_2$ bond and a V-O bond and which partly contains a vanadiosiloxane bond, the ratio of the number of silicon atoms to that of vanadium atoms being in the range of from 3:1 to 1000:1, the side-chain group directly bonded to the silicon atom being selected from the group consisting of hydrogen, methyl, ethyl and phenyl, and the vanadium atom being bonded to the silicon atom through an oxygen atom with substantially no side-chain organic group present which is directly bonded to the vanadium atom.

4 Claims, 4 Drawing Figures

ORGANOMETALLIC POLYMER AND PROCESS FOR PRODUCTION THEREOF

BACKGROUND OF THE INVENTION

This invention relates to a novel organometallic polymer partly containing a vanadiosiloxane bond (V-O-Si) which has excellent heat resistance and oxidation resistance and a high residual ratio (percent of weight after firing/weight before firing) on firing in a non-oxidizing atmosphere such as nitrogen, argon, helium, ammonia and hydrogen.

Various processes have previously been proposed for the production of polycarbosilanes having $Si-CH_2$ as a main-chain skeleton with an organic side-chain group attached to the silicon atom. For example, Fritz discloses a process for production of a polycarbosilane from a monosilane at page 657 of Angew. Chem., 79 (1967). U.S. Pat. No. 4,052,430 to Yajima et al. discloses a process for producing a polycarbosilane from a polysilane using an autoclave. Furthermore, U.S. Pat. No. 4,220,600 to Yajima et al. discloses a polycarbosilane partly containing a siloxane bond which can be produced by a process which does not require an autoclave.

We have now found that a novel organometallic polymer consisting mainly of carbosilane and partly containing a vanadiosiloxane bond which has better heat resistance and oxidation resistance and a higher residual ratio on firing than conventional polycarbosilanes can be obtained by reacting polyvanadiosiloxane or a vanadium complex in which a coordination atom adjacent to the vanadium atom is oxygen, with a polysilane.

SUMMARY OF THE INVENTION

According to this invention, there is provided a novel organometallic polymer of which the main-chain skeleton consists of a $Si-CH_2$ bond and a V-O bond and which partly contains a vanadiosiloxane bond, the ratio of the number of silicon atoms to that of vanadium atoms being in the range of from 3:1 to 1000:1, the side-chain group directly bonded to the silicon atom being selected from the group consisting of hydrogen, methyl, ethyl and phenyl, and the vanadium atom being bonded to the silicon atom through an oxygen atom with substantially no side-chain organic group directly bonded to the vanadium atom.

According to this invention, there is also provided a process for producing the aforesaid novel organometallic polymer which comprises mixing polyvanadiosiloxane or a vanadium complex in which a coordination atom adjacent to the vanadium atom is oxygen, with a polysilane of the formula

wherein $R_1$ and $R_2$ are identical or different and each represents a member selected from the group consisting of hydrogen, methyl, ethyl and phenyl, provided that $R_1$ and $R_2$ are not both hydrogen; and n is a number of not more than 500, and reacting the mixture at a temperature of 250° to 500° C. in a non-oxidizing atmosphere.

DETAILED DESCRIPTION OF THE INVENTION

Figure 1:
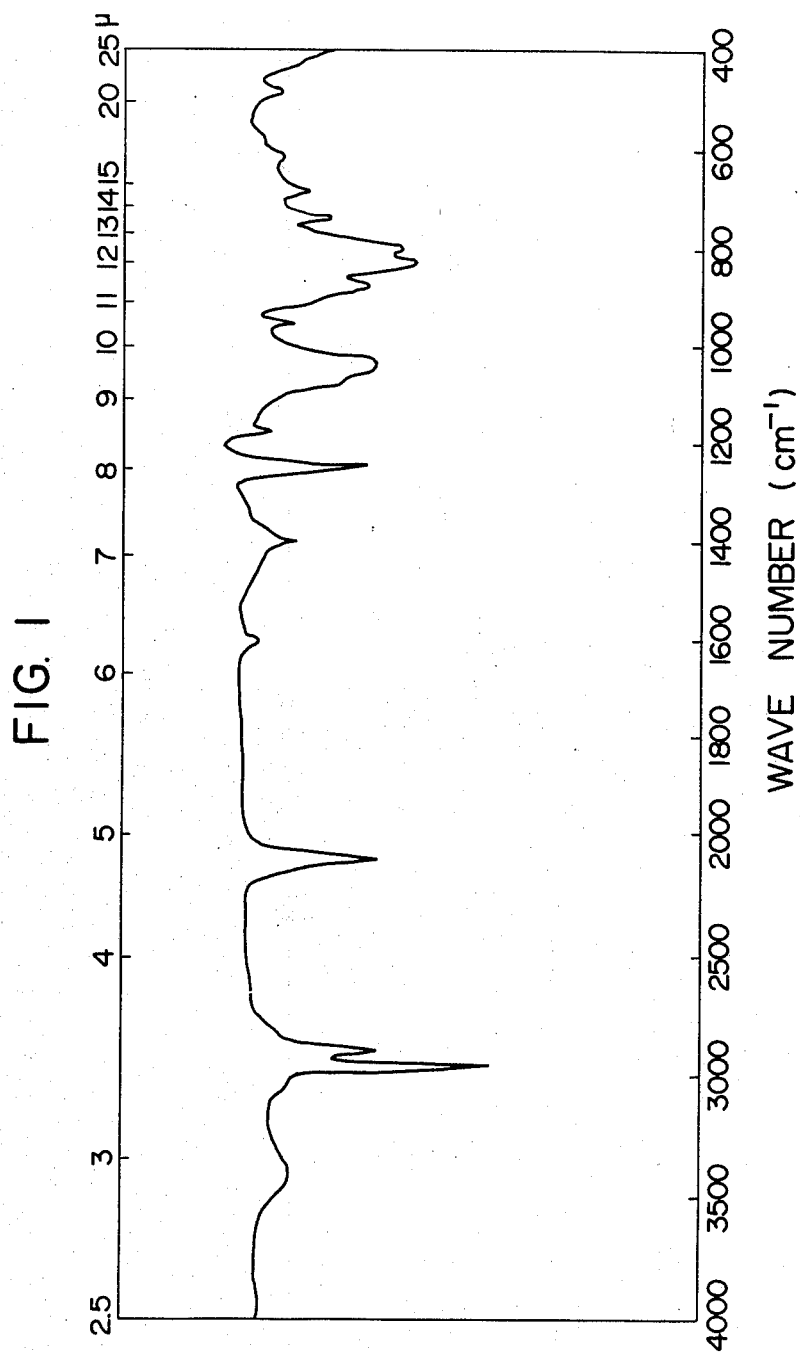
FIG. 1 is an infrared absorption spectrum chart of the organometallic polymer of this invention.

The process of the invention is first described.

One starting material used in the process of this invention is a polysilane of the formula

wherein $R_1$, $R_2$ and n are as defined above. This polysilane may be of a linear or cyclic structure or a linear-cyclic mixed structure. In the above formula, n is usually at least 3 ($n \geq 3$), preferably $5 \leq n \leq 100$. The sequence of arrangement of the hydrogen, methyl, ethyl and phenyl forming the side-chain groups $R_1$ and $R_2$ is optional.

An especially suitable polysilane used in the process of this invention is polysilane consisting only of a structure of the formula

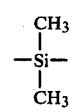

or a polysilane in which at least 50% of the side-chains consists of methyl and the remainder being phenyl and-/or hydrogen. In the case of linear polysilanes, the terminal groups are preferably OH or $CH_3$.

The other starting material used in the process of this invention to react with the polysilane is polyvanadiosiloxane, or a vanadium complex.

Polyvanadiosiloxane is a polymer which can be produced by the process disclosed in U.S. patent application Ser. No. 210,639 filed Nov. 26, 1980 by Yajima et al., and its main-chain skeleton consists of a Si-O bond and a V-O bond.

The vanadium complex used in the process of this invention is a vanadium complex in which a coordination atom adjacent to the vanadium atom is oxygen. Examples of such a vanadium complex are as follows:

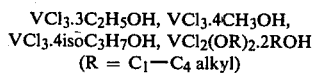

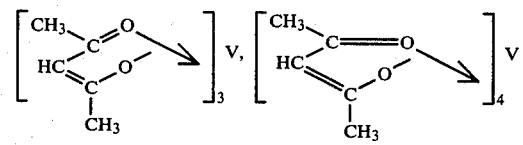

Such a vanadium complex in which a coordination atom adjacent to the vanadium atom is oxygen can be produced, for example by the following methods.

(1) By the reaction of an inorganic compound of vanadium with a complex-forming agent capable of easily forming a complex with the inorganic vanadium compound. Examples of the inorganic compound of vanadium include vanadium halides such as $VCl_4$, $VCl_3$ and $VCl_2$, oxysulfates of vanadium such as $VOSO_4$, oxyoxalates of vanadium such as $VOC_2O_4$, sulfates of vanadium such as $V_2(SO_4)_3$, oxyhalides of vanadium such as $VOBr_2$, and alkali metal or ammonium salts of the aforesaid compounds, such as $Na(VOCl_4)$, $(NH_4)V(SO_4)_2$ and $K[VO(C_2O_4)_2]$. Examples of the complex forming agents include $C_4H_8O$(tetrahydrofuran), $CH_3OH$, $C_5H_8O_2$ (acetylacetone), $C_2H_5OC_2H_5$, n-$C_4H_9OC_4H_9$, $(CH_2OH)_2$, $CH_3COCH_3$, $C_5H_5OH$, $C_5H_4O_2$ (pyrone), $C_7H_6O$ (benzaldehyde), $C_7H_6O_2$ (benzoic acid) and $C_7H_8O$ (benzylalcohol).

Generally, in order to react the vanadium compound with the complex-forming agent, it is sufficient only to dissolve the vanadium compound in the complex-forming agent with or without heating. In the vanadium complex used in the process of this invention, the vanadium atom may have an atomic valence of 2, 3, 4 or 5.

A product obtained by dissolving a complex salt of vanadium, such as vanadium acetylacetone complex, in the aforesaid complex-forming agent to react it further may be preferably used in this invention because its reactivity with the polysilane increases.

(2) By dissolving an organic compound of vanadium such as $V_2OCl_3(OR)_3$, $V(OR)_n$, $VO_x(OR)_{4-x}$ (wherein R is $C_1$-$C_4$ alkyl, n is 3, 4, or 5 and x is 1 or 2), $VCl(OCH_3)_2$, and $VOCl_2(OC_2H_5)$ in a lower alcohol such as methanol, ethanol, n-propanol, iso-propanol, n-butanol, sec-butanol and t-butanol, the vanadium complex used in this invention can also be produced.

According to the process of this invention, the organometallic polymer is produced by mixing the polyvanadiosiloxane or the vanadium complex in which a coordination atom adjacent to the vanadium atom is oxygen, with at least one polysilane of the formula

and heating the mixture at 250° to 500° C. in a non-oxidizing atmosphere to perform polymerization.

It is necessary that the heating should be carried out in a non-oxidizing atmosphere. If the polymerization reaction is carried out in an oxidizing atmosphere such as air, oxidation of the starting polysilane takes place so that the reaction does not sufficiently proceed. Nitrogen, argon, hydrogen and ammonia are suitable as the non-oxidizing atmosphere inert to the reaction. Nitrogen, argon and helium are especially preferred because of their good ability to be handled.

Preferably, the polymerization reaction is carried out generally at atmospheric pressure or pressures close to it. If the polymerization reaction is carried out in vacuum or at highly reduced pressures, low-molecular components distill out of the reaction system to reduce the yield of the product drastically. Furthermore, it is preferred that the polymerization reaction in the process of this invention be carried out while introducing the nonoxidizing gas at a fixed flow rate into the reactor. This is because by so doing, the pressure in the reaction vessel can be maintained nearly at atmospheric pressure, and a rise in temperature, or a rise in pressure owing to gases such as methane released during the reaction, can be avoided.

The heating temperature in the process of this invention is usually 250° to 500° C. If the reaction temperature is below 250° C., the polymerization does not easily proceed, and if the temperature exceeds 500° C., the resulting organometallic polymer begins to become inorganic, (namely, liberation of side-chain components gradually begins).

The ratio between the polysilane and the vanadium compound (polyvanadiosiloxane or the vanadium complex) is determined so that the ratio of the number of silicon atoms to that of vanadium atoms in the final organometallic polymer is within the range of 3:1 to 1000:1.

The time required for the heat polymerization in the process of this invention is usually 1 to 10 hours, and the reaction substantially comes to an end within 10 hours.

Practice of the process of this invention requires only a simple reactor including a reflux device, etc., and no special device such as a pressurized vessel or a flowing-type device capable of permitting recycling is required.

The organometallic polymer obtained by the aforesaid polymerization can be purified by dissolving it in a solvent such as n-hexane, benzene, xylene or tetrahydrofuran, filtering it, and evaporating the solvent from the filtrate. If required, the purified product may further be distilled and concentrated under atmospheric pressure or under reduced pressure at a temperature of 50° to 450° C.

A description of the organometallic polymer obtained by the above process and partly containing a vanadiosiloxane bond follows.

Figure 2:
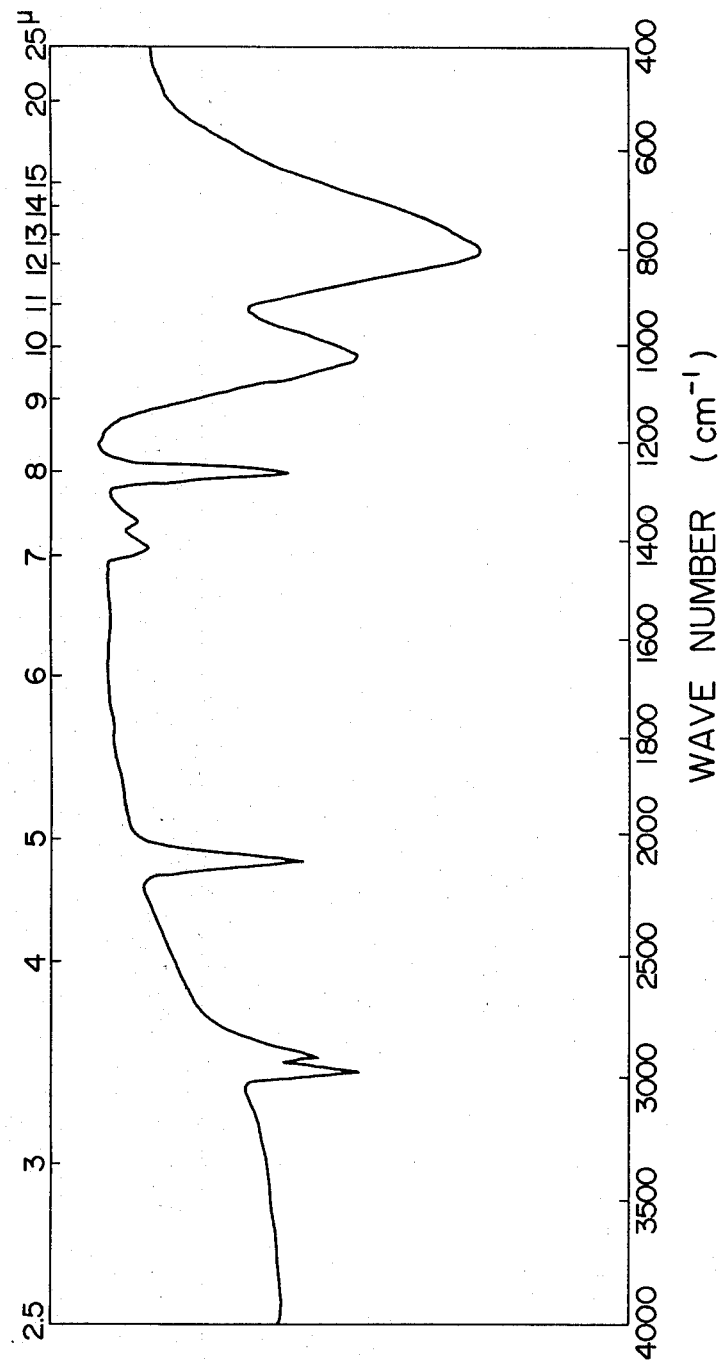
FIGS. 2 and 3 are infrared absorption spectrum charts of prior art polycarbosilanes given for comparison.
Figure 3:
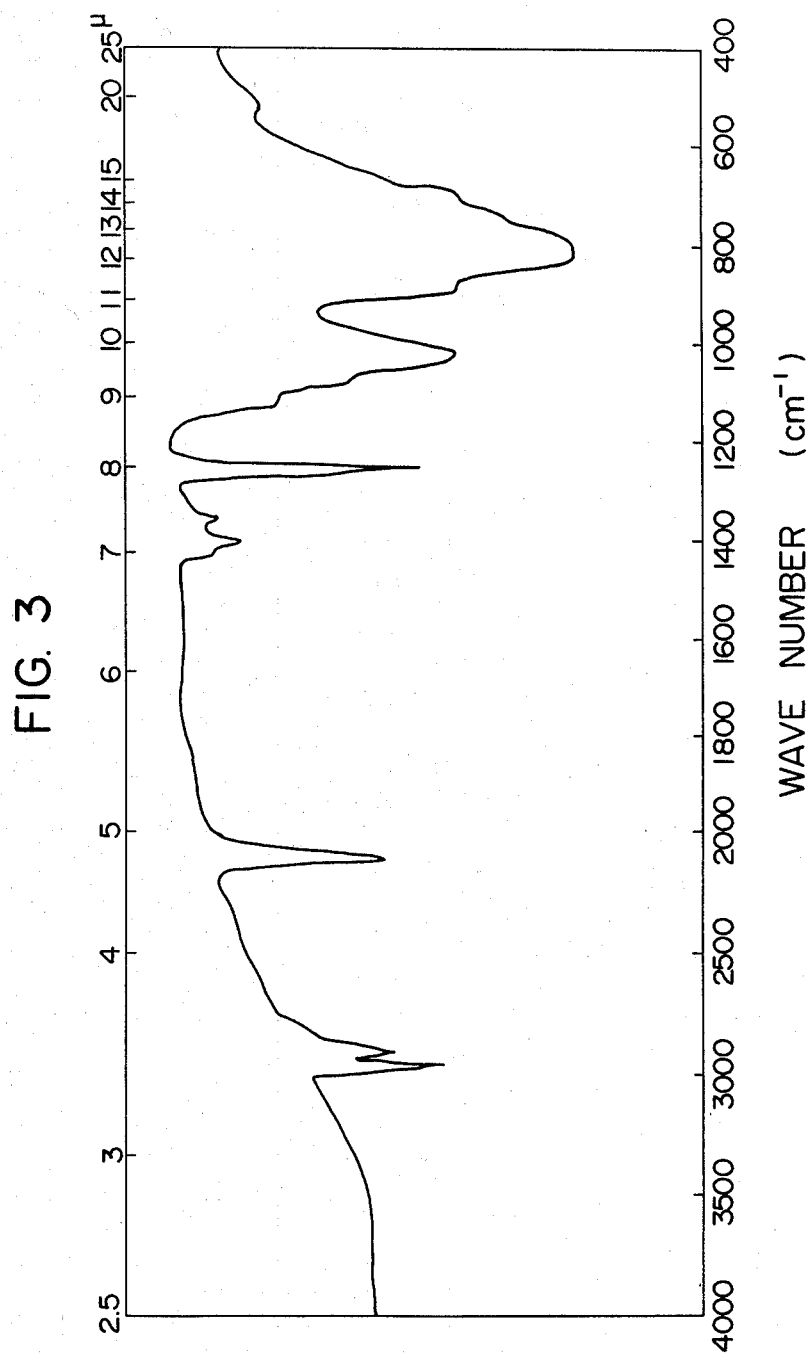

The organometallic polymer obtained in hereinbelow Example 1 from polydimethylsilane as the starting polysilane shows an infrared absorption spectrum given in FIG. 1. For comparison, an infrared absorption spectrum of polycarbosilane synthesized by treating polydimethylsilane in an argon atmosphere at 470° C. and 36 atmospheres for 36 hours in an autoclave in accordance with the method disclosed in U.S. Pat. No. 4,052,430 to Yajima et al. is shown in FIG. 2. Furthermore, FIG. 3 shows an infrared absorption spectrum of polycarbosilane partly containing a siloxane bond obtained by mixing 250 g of polydimethylsilane with 10 g of polyborodiphenylsiloxane, heating the mixture to 370° C. in a nitrogen stream and polymerizing it for 5 hours, by the method disclosed in U.S. Pat. No. 4,220,600 to Yajima et al.

The infrared absorption spectrum given in FIG. 1 shows absorptions of C-H at 2950 cm$^{-1}$ and 2900 cm$^{-1}$, Si-H at 2100 cm$^{-1}$, Si-CH$_3$ at 1260 cm$^{-1}$ and 800 cm$^{-1}$, and Si-CH$_2$-Si at 1040 cm$^{-1}$, and also exhibits new absorption peaks at 3400 cm$^{-1}$, 1600 cm$^{-1}$, 1180 cm$^{-1}$, 960 cm$^{-1}$, 880 cm$^{-1}$, 740 cm$^{-1}$, and 490 cm$^{-1}$ ascribable to the Si-O-V bond. These new absorption peaks are not seen in the infrared absorption spectra of the polycarbosilane in FIG. 2 and the polycarboxilane partly containing a siloxane bond in FIG. 3.

Observation of the novel organometallic polymer obtained in Example 1 with an electron microscope showed that no crystal grain is present in its bright field image. The results of measurements by powder X-ray diffraction and electron beam diffraction showed no formation of solid vanadium oxide. These experimental data led to the determination that substantially all of the vanadium atoms are involved in the Si-O-V bond.

Figure 4:
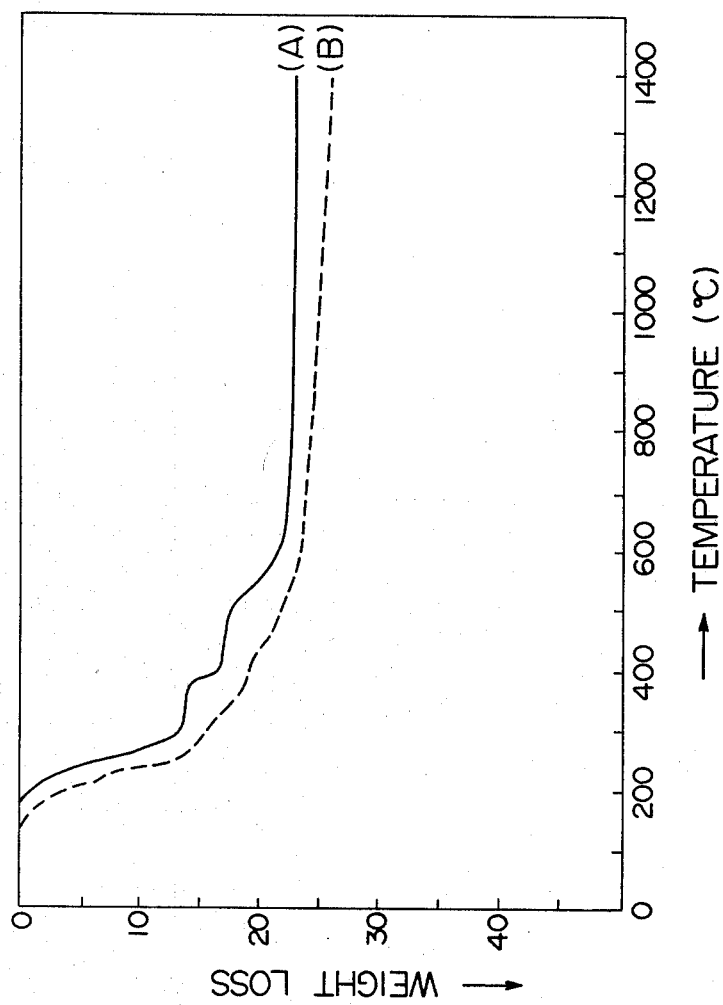
FIG. 4 shows a comparison of the results of the thermogravimetric analysis of the organometallic polymer of the invention and the prior art polycarbosilane.

A particular difference of the organometallic polymer of this invention from conventional polycarbosilanes is that its main-chain skeleton consists of an Si-CH₂ bond and a V-O bond, and when it is fired in a nonoxidizing atmosphere, crosslinking through the vanadiosiloxane portion proceeds further at 300° to 350° C. to increase its crosslinking density and inhibit heat decomposition of the organometallic polymer, and therefore its residual ratio on firing is high. This fact is clearly shown by the results of thermogravimetric analysis described in FIG. 4. Curve (A) in FIG. 4 is a thermogravimetric curve of the organometallic polymer obtained in Example 1, and curve (B) is a thermogravimetric curve of polycarbosilane partly containing a siloxane bond produced by the method described in U.S. Pat. No. 4,220,600 to Yajima et al.

The structure of the organometallic polymer of this invention is complex, and complete elucidation of its exact structure is impossible according to the present technical level of chemistry. The present inventors, however, presume that it has partial structures exemplified hereinbelow.

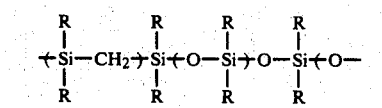

(A)

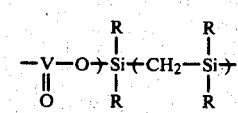

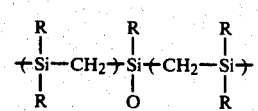

(B)

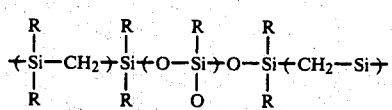

(C)

(D)

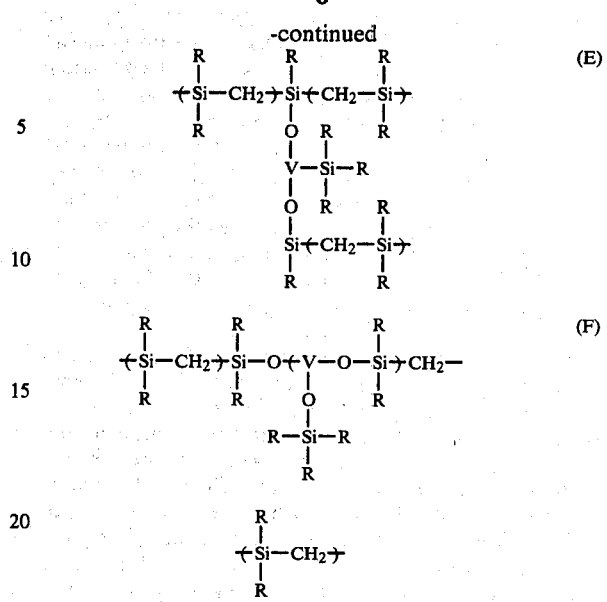

(In the above formulae, R is at least one member selected from the group consisting of methyl, ethyl, phenyl and hydrogen.)

In the above exemplification of the partial structures of the organometallic polymer with a main chain skeleton consisting of an Si-CH₂ bond and a V-O bond, a trivalent or tetravalent vanadium atom is bonded to the silicon atom through an oxygen atom. Generally, in the organometallic polymer of this invention, the stable atomic valence of the vanadium atom is trivalent or tetravalent, but a divalent vanadium atom could exist.

Powder X-ray diffraction analysis of the organometallic polymer of this invention has shown it to be amorphous as are conventional polycarbosilanes. When the polymer is fired in a non-oxidizing atmosphere such as argon, helium, hydrogen, ammonia and nitrogen gas, it is converted mainly to β-SiC containing vanadium. When a fired product obtained by firing the novel organic organometallic polymer (obtained in Example 1) in an argon stream at 1400° C. for 1 hour is analyzed by powder X-ray diffraction using a nickel filter and a Cu target as an X-ray source, β-SiC and graphite are mainly identified. Vanadium is detected from the resulting product by a wet colorimetric method.

From the results of elemental analysis of the organometallic polymer obtained by this invention, the weight percentages of the individual elements in the polymer are generally as follows:

Si: 30-60, C: 20-60, O: 0.5-3, H: 5-10,
V: 0.01-15% by weight

The results of measurement of the molecular weight distribution of the polymer by G. P. C. show that the polymer has a molecular weight distribution in the range of 500 to 100,000, and its number average molecular weight, measured by the vapor pressure method, is 1400 to 2200.

The organometallic polymers in which the main-chain skeleton consists of an Si-CH₂ bond and a V-O bond are thermoplastic substances, which are soluble in organic solvents such as n-hexane, xylene, tetrahydrofuran and benzene, and melt by heating to 60° to 300° C. Hence, they can be molded using various aggregates by utilizing an ordinary monoaxial press, isostatic press, injection press, etc. or by extrusion molding. The molded article is fired in a non-oxidizing atmosphere at a temperature of at least 800° C. to convert a part of the binder to an inorganic carbide SiC. Alternatively, a sintered molded article may be obtained by impregnating an inorganic fired article prepared separately, with a molten mass of the organometallic polymer of the invention obtained by heating in a non-oxidizing atmosphere, or a solution of the organometallic polymer of the invention in an organic solvent, and firing the impregnated molded article at 1300° to 1800° C. in a non-oxidizing atmosphere, whereby the pores in the inorganic fired article are filled with SiC.

The novel organometallic polymer of the invention whose main-chain skeleton consists of an Si-CH$_2$ bond and a V-O bond and which partly contains a vanadiosiloxane bond and has excellent heat resistance and oxidation resistance is very advantageous for forming continouous filaments, films, coated films and powders composed mainly of silicon carbide because its residual ratio on firing in a non-oxidizing atmosphere is high.

Table 1 below summarizes the properties of the novel organometallic polymer partly containing a vanadiosiloxane bond shown in Example 1 in comparison with those of polycarbosilane synthesized from polydimethylsilane in an autoclave at 470° C. for 14 hours with the final pressure in the vessel being 110 atmospheres in accordance with the method disclosed in U.S. Pat. No. 4,052,430, and polycarbosilane partly containing a siloxane bond which is synthesized from polydimethylsilane and 3.85% by weight of polyborodiphenylsiloxane at 400° C. for 5 hours in a nitrogen atmosphere in accordance with the method disclosed in U.S. Pat. No. 4,220,600.

TABLE 1

| Properties | Polycarbosilane (U.S. Pat. No. 4,052,430) | Polycarbosilane partly containing a siloxane bond (U.S. Pat. No. 4,220,600) | Novel organometallic polymer (Example 1) |
|---|---|---|---|
| Number average molecular weight | 1800 | 1720 | 1900 |
| Decomposition temperature (°C.) | 310 | 350 | 370 |
| Weight increase (%) owing to oxidation after maintaining at 200° C. for 1 hour in the air | 9.0 | 6.5 | 6.0 |
| Residual ratio (%) on firing (after maintaining at 1500° C. in argon gas for 1 hour) | 49.8 | 73.8 | 75.0 |

The results given in Table 1 show that the organometallic polymer of this invention has improved properties over prior art polycarbosilanes.

The following Examples illustrate the present invention.

EXAMPLE 1

40 ml of a solution of 25 g of VCl$_4$ in 500 ml of tetrahydrofuran was added to 20 g of a,w-dihydroxypolydimethylsiloxane having an average degree of polymerization of 500 in a beaker. The beaker containing the above mixture was heated on a hot plate at 190° C., and the heating was stopped when the mixture became highly viscous. The mixture was then hot-filtered, and tetrahydrofuran was added to the filtrate so that the total amount of the mixture reached 100 ml.

Twenty grams of polydimethylsilane of the formula

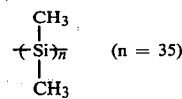

was weighed into a 200 ml bulb-shaped flask, and 100 ml of the above tetrahydrofuran solution was added. They were stirred in a nitrogen atmosphere, and the mixture was heated to 200° C. from room temperature so as to evaporate the tetrahydrofuran.

Then, a reflux condenser was attached to a 100 ml. bulb-shaped flask, and the bottom of the flask was kept at 400° C. in a nitrogen atmosphere. The reaction was performed by heating with an electric furnace, and the reaction mixture was maintained at 400° C. for 5 hours.

After the reaction, xylene was added, and the solution was filtered at atmospheric pressure. The filtration product was transferred to a 200 ml roundbottomed separable flask, and a Liebich condenser was attached to the flask for distillation. With stirring, nitrogen gas was passed through the flask, and the product was heated from room temperature by a mantle heater.

By heating, xylene was distilled at the boiling point (140° C.) of xylene, and then the temperature was slowly raised up to 320° C. at a rate of 10° C./10 minutes to remove a low-molecular-weight organometallic polymer, and concentrate the product.

The above procedure gave 12 g of a concentrate. Its infrared absorption spectrum was measured, and the results are shown in FIG. 1.

The organometallic polymer was subjected to elemental analysis, and the results were as follows:

Si: 50% by weight
C: 38% by weight
H: 6% by weight
O: 4.8% by weight
V: 1.0% by weight When the organometallic polymer was fired in an atmosphere of argon from room temperature to 1500° C., its residual ratio on firing was 75%. Powder X-ray diffraction (CuKα,Ni filter) of the fired product led to the determination that the fired product consisted mainly of β-SiC, and α-SiC and graphite were also identified. Vanadium was detected from the fired product by a wet colorimetric method.

The organometallic polymer was found to have a molecular weight distribution, measured by GPC, of from 500 to 100,000. The polymer was also found to have a number average molecular weight, measured by the vapor pressure method, of 1900.

EXAMPLE 2

In a 100 ml bulb-shaped flask, 40 g of the same polydimethylsilane as used in Example 1 was mixed with 15 ml of a VCl$_4$/tetrahydrofuran complex obtained by dissolving 25 g of VCl$_4$ in 500 ml of tetrahydrofuran.

A rotary evaporator was attached to the bulb-shaped flask, and the tetrahydrofuran was evaporated at a water bath temperature of 60° C. and a pressure of 50 mmHg produced by a water flow pump. Then, the same procedure as in Example 1 was repeated to give an organometallic polymer. The polymer was filtered and concentrated to give 26 g of a final product.

The resulting final organometallic polymer was heated from room temperature to 1400° C. at a rate of 5° C./min. The heated product was thermogravimetrically analyzed. It was found that the residual ratio on firing was 65%.

EXAMPLE 3

A solution of 6.5 g of vanadyl sulfate ($VOSO_4$) in 100 cc of acetylacetone was well mixed with 50 g of polysilane in which the ratio of methyl groups/phenyl groups in the side chain was 70:30. The acetylacetone was evaporated by distillation. Then, the dry powder was put into a three-necked flask equipped with a stirrer, and in a stream of argon, the bottom of the flask was heated to 500° C. to melt it. Then, it was polymerized for 10.5 hours.

The polymer was dissolved in tetrahydrofuran, and filtered. Then, tetrahydrofuran was evaporated in a stream of nitrogen, and the residue was then concentrated at 350° C. for 1 hour.

The resulting organometallic polymer had a number average molecular weight of 2013, and when it was fired at 1700° C. for 1 hour in a stream of argon, the residual ratio on firing was 70%.

EXAMPLE 4

100 g of polydimethylsilane (degree of polymerization 50) and 3 g of vanadyl oxalate ($VOC_2O_4$) in 50 cc of tetrahydrofuran were mixed in a stream of argon. The tetrahydrofuran was evaporated by distillation. Then, the mixture was bubbled with nitrogen gas in a stream of nitrogen in a reactor equipped with a reflux condenser, and then polymerized at 370° C. for 6.0 hours.

The polymer was heated from room temperature to 1400° C. in a stream of argon, and a change in weight was measured. The residue was 72%. Powder X-ray diffraction analysis of the fired product led to the identification of $\beta$-SiC and graphite.

What we claim is:

1. An organometallic polymer of which the main-chain skeleton consists of a Si-CH$_2$ bond and a V-O bond and which partly contains a vanadiosiloxane bond, the ratio of the number of silicon atoms to that of vanadium atoms being in the range of from 3:1 to 1000:1, the side-chain group directly bonded to the silicon atom being selected from the group consisting of hydrogen, methyl, ethyl and phenyl, and the vanadium atom being bonded to the silicon atom through an oxygen atom with substantially no side-chain organic group present which is directly bonded to the vanadium atom.

2. The organometallic polymer of claim 1 which melts when heated to 60° to 300° C.

3. The organometallic polymer of claim 1 which is soluble in organic solvents.

4. A process for producing the organometallic polymer of claim 1 which comprises mixing polyvanadiosiloxane or a vanadium complex in which a coordination atom adjacent to the vanadium atom is oxygen, with a polysilane of the formula

wherein $R_1$ and $R_2$ are identical or different and each represents a member selected from the group consisting of hydrogen, methyl, ethyl and phenyl, provided that $R_1$ and $R_2$ are not both hydrogen; and n is a number of not more than 500, and reacting the mixture at a temperature of from 250° C. to 500° C. in a non-oxidizing atmosphere.

* * * * *